United States Patent
Hiratsuka et al.

[11] Patent Number: 6,110,584
[45] Date of Patent: Aug. 29, 2000

[54] MAGNETIC RECORDING MEDIUM

[75] Inventors: Ryoichi Hiratsuka; Yuka Ito; Kazuo Hoshi, all of Miyagi, Japan

[73] Assignee: Sony Corporation, Tokyo, Japan

[21] Appl. No.: 09/149,863

[22] Filed: Sep. 9, 1998

[30] Foreign Application Priority Data

Sep. 12, 1997 [JP] Japan ................................. 9-249147

[51] Int. Cl.[7] .................................................. G11B 05/72
[52] U.S. Cl. ..................... 428/336; 428/408; 428/694 TC
[58] Field of Search ........................... 428/408, 694 TC, 428/336, 900

[56] References Cited

U.S. PATENT DOCUMENTS 5,045,165  9/1991  Yamashita ........................... 204/192.16
5,614,314  3/1997  Itoh et al. ............................... 428/332

Primary Examiner—Stevan A. Resan
Attorney, Agent, or Firm—Jay H. Maioli

[57] ABSTRACT

A magnetic recording medium having an excellent sliding durability, and including a magnetic layer of a metal magnetic thin film formed on a non-magnetic support body and a carbon protection film formed on the magnetic layer. Recording and/or reproduction is carried out by sliding a magnetic head. The carbon protection film shows, in a Raman spectrum obtained by Raman spectrum analysis using an argon ion laser having a wavelength of 514.5 nm, an intensity ratio A/B of 2 or above for a main peak intensity A appearing in the vicinity of wave number 1550 $cm^{-1}$ with respect to a background intensity B.

4 Claims, 3 Drawing Sheets

MAGNETIC RECORDING MEDIUM

BACKGROUND OF THE INVENTION

1. Field of the Invention

The present invention relates to a metal magnetic thin film type magnetic recording medium onto/from which recording and/or reproduction is carried out by sliding of a magnetic head and in particular, to an improvement of a carbon protection film.

2. Description of the Prior Art

Conventionally, the magnetic recording medium widely used is a so-called paint-type magnetic recording medium which is prepared by coating a non-magnetic support body with a magnetic paint made from a powder magnetic material such as an oxide magnetic powder or an alloy magnetic powder dispersed in an organic binder such as vinyl chloride—vinyl acetate copolymer, polyester resin, urethane resin, and the like.

In contrast to this, with increasing requirement for a high-density recording, attention is paid on a so-called metal magnetic thin film type recording medium which is prepared by directly applying a metal magnetic material such as a Co-Ni alloy, Co-Cr alloy, Co-O alloy by way of plating or vacuum thin film formation means (vacuum deposition, sputtering, ion plating method, and the like).

This metal magnetic thin film type magnetic recording medium has various merits such as an excellent anti-magnetization force and rectangular ratio and enables to obtain an extremely thin magnetic layer, which in turn suppresses the recording magnetization loss and the thickness loss during reproduction, enabling to obtain an excellent electromagnetic conversion characteristic in a short wavelength. Moreover, because there is not need of mixing a non-magnetic material such as a binder in the magnetic layer, it is possible to increase the magnetic material filling density. Consequently, it is considered that the metal magnetic thin film type magnetic recording medium will become a main stream of the high-density magnetic recording because of its excellent magnetic characteristic.

Furthermore, in order to improve the electro-magnetic conversion characteristic of this type of magnetic recording medium so as to obtain a high output in a shorter wavelength, a so-called oblique-deposited medium has been suggested and used in practice. This oblique-deposited medium is a magnetic metal thin film type magnetic recording medium having a magnetic layer formed by way of so-called oblique deposition, i.e., a magnetic metal is deposited in an oblique direction onto a traveling non-magnetic support body.

On the other hand, in order to answer to a further higher density recording, there is a tendency that the magnetic recording medium is made flat so as to reduce a spacing loss. The flattening of the magnetic recording medium is accompanied by increase of the friction between a head and a medium, increasing the shearing stress generated in the medium. Here, in order to improve the sliding durability, there has been studied a technique to form a protection film on the surface of the magnetic layer.

As such a protection film, a carbon film, quartz ($SiO_2$) film, a zirconia ($ZrO_2$) film, and the like have been studied and implemented in practice for a hard disc. As for the carbon protection film, a diamond-lie carbon (hereinafter, referred to as DLC) film is studied as a harder film. The DLC film is formed by using a sputtering method, a chemical vapor phase epitaxy (hereinafter, referred to as CVD) method, and the like.

In the sputtering method, firstly, an electric field and a magnetic field are used for plasmatizing an inert gas such as argon gas and the plasmatized argon ion is accelerated so that its kinetic energy strikes out a target atom. The struck out atom is accumulated on a opposing substrate, thus forming a film as a purpose. This sputtering method has a poor productivity from an industrial viewpoint because the aforementioned DLC film is formed with a low speed.

On the contrary, the CVD method is a chemical process in which the plasma energy generated by an electric field and a magnetic field causes a chemical reaction of a material gas such as decomposition and synthesis. The DLC film formation speed is faster than in the sputtering method.

Thus, by providing the carbon protection film by way of the aforementioned methods, the magnetic recording medium significantly increases its sliding durability.

However, these years, the magnetic recording apparatus tends to become smaller and to have a greater capacity. Especially for the data storage use which requires a high reliability, a further improved sliding durability is required.

Moreover, the magnetic head of the magnetic recording/reproduction apparatus has a lower floating amount. As the extreme case of the floating amount, a so-called contact method is also suggested in which recording and reproduction are carried out with the magnetic head always in contact with the surface of a magnetic recording medium.

In the magnetic recording medium in which recording and/or reproduction is carried out by way of contact sliding between a magnetic head and a magnetic recording medium surface, it is necessary to further reduce the friction and improve the sliding durability.

SUMMARY OF THE INVENTION

It is therefore an object of the present invention to provide a magnetic recording medium having a further improved sliding durability.

The inventors of the present invention has made various studies and found that a carbon protection film showing in a Raman spectrum obtained by Raman spectrum analysis, an intensity ratio of 2 or above for a main peak intensity appearing in the vicinity of wave number 1550 $cm^{-1}$ with respect to a background intensity shows a low friction and an excellent sliding durability.

That is, the magnetic recording medium according to the present invention includes a magnetic layer of a metal magnetic thin film formed on a non-magnetic support body and a carbon protection film formed on the magnetic layer, wherein recording and/or reproduction is carried out by sliding of a magnetic head, and the aforementioned protection is characterized in that in a Raman spectrum obtained by a Raman spectrum analysis using an argon ion laser having a wavelength of 514.5 nm, the ratio of the main peak intensity appearing in the vicinity of wave number of 1550 $cm^{-1}$ with respect to a background intensity is 2 or above.

The magnetic recording medium according to the present invention includes a carbon protection film showing a Raman spectrum pattern (intensity ratio) obtained by a Raman spectrum analysis which is defined in a specific range and enables to obtain a carbon protection film having an excellent shuttle characteristic and still characteristic. As a result, it is possible to provide a magnetic recording medium having an excellent sliding durability.

DETAILED DESCRIPTION OF PREFERRED EMBODIMENTS

Hereinafter, description will be directed to a magnetic recording medium according to the present invention.

The magnetic recording medium according to the present invention includes a magnetic layer formed from a metal magnetic thin film on a non-magnetic support body, and the magnetic layer is covered with a carbon protection film which satisfies a condition as follows.

Figure 1:
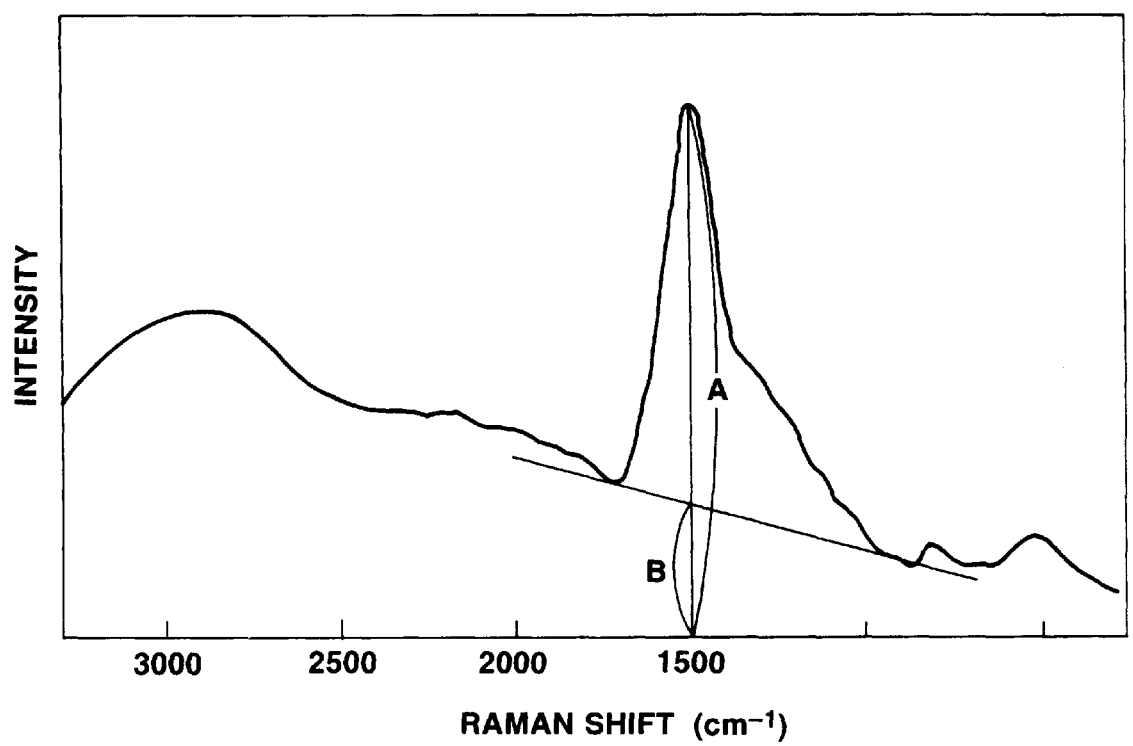
FIG. 1 shows a Raman spectrum of a carbon protection film of a magnetic recording medium according to the present invention.

That is, the aforementioned carbon protection films, as shown in FIG. 1, shows a Raman spectrum obtained by a Raman spectrum analysis using an argon ion laser of wavelength 514.5 nm, in which Raman spectrum intensity ratio A/B is 2 or above, assuming A is a main peak intensity appearing in the vicinity of the wave number 1550cm$^{-1}$ and B is a background intensity.

Here, the background intensity B is a base line connecting the minimum values at both ends of the main peak appearing in the vicinity of the wave number 1550 cm$^{-1}$. The inclination of this base line is changed depending on a hydrogen concentration in the carbon protection film (material gas composition) and a voltage condition applied to an electrode.

The aforementioned intensity ratio A/B is 2 or above and more preferably, in a range from 2.5 to 4.2. If the intensity ratio A/B is below 2, it is considered that almost no amorphous carbon is generated. Moreover, if the intensity ratio A/B exceeds 4.2, the voltage applied to the CVD apparatus is increased and there is a danger that the non-magnetic support body may be damaged by heat.

This carbon protection film is preferably formed, for example, by way of a vacuum thin film formation technique such as the CVD method and the sputtering method, in which a material is subjected to vapor phase chemical reaction and then accumulated on a non-magnetic support body. In particular, the CVD method is preferably used because it enables a high-speed film formation.

Moreover, in this case, the carbon protection film is preferably formed as a hard carbon film of amorphous configuration, i.e., so-called DLC film. The DLC film enables to realize a high hardness and low friction in a thin film area (in the order of 10 nm) and accordingly, the DLC film is preferable as a protection film of a sliding medium such as a tape.

The carbon protection film preferably has a thickness from 1 to 20 nm. If the carbon protection film has a thickness below 1 nm, it is impossible to obtain a sufficient effect of providing the protection film. Moreover, if the carbon protection film has a too great thickness, the coercive force of the magnetic layer is lowered. Besides, in order to increase the length of the magnetic tape which can be contained in a cassette, the thickness of the carbon protection film is preferably equal to or below 20 nm.

Thus, the carbon protection film having the intensity ratio A/B equal to or above 2 for the main peak intensity A in the vicinity of wave number 1550 cm$^{-1}$ with respect to the background intensity B exhibits a low fiction and an excellent sliding durability.

Consequently, the magnetic recording medium according to the present invention is a magnetic recording medium in which recording and/or reproduction are carried out by sliding of a magnetic head and is appropriate to be used as a magnetic recording medium for a special use requiring a high reliability such as a data streamer and a video library. Moreover, the magnetic recording medium according to the present invention may be a disc-shaped or tape-shaped medium but can preferably be used as a magnetic recording medium such as a tape-shaped medium which, unlike a disc-shaped medium contained in a case, is often exposed outside and should have a strict environment-proof characteristic.

Now, the present invention relates to a so-called metal magnetic thin film type magnetic recording medium but does not limit to particular materials the non-magnetic support body and the metal magnetic thin film.

The non-magnetic support body may be made from any of materials which are usually used for a non-magnetic support body in this type of magnetic recording medium. For example, it is possible to form the non-magnetic support body by using polyethylene terephthalate, polyethylene-2, 6-naphthalate, and other polyesters: polyethylene, polypropylene, and other polyolefins; cellulose triacetate, cellulose diacetate, cellulose triacetate butylate, and other cellulose derivatives; polyvinyl chloride, polyvinylidene chloride, and other vinyl resins; polycarbonate, polyamide, polyimide, and other high molecule materials; alumina glass, ceramics, and the like.

The magnetic layer is formed by way of film formation using a ferromagnetic metal material. The ferromagnetic metal material may be any of the materials which are used for an ordinary deposited tape. For example, it is possible to use Fe, Co, Ni, and other ferromagnetic metals; and Fe-Co, Co-Ni, Fe-Co-Ni, Fe-Cu, Co-Cu, Co-Au, Co-Pt, Mn-Bi, Mn-Al, Fe-Cr, Co-Cr, Ni-Cr, Fe-Co-Cr, Co-Ni-Cr, Fe-Co-Ni-Cr, and other ferromagnetic alloys. The magnetic layer made from these ferromagnetic metals may be a single-layered film or multi-layered film.

The magnetic layer may be formed by using a vacuum deposition method in which a ferromagnetic metal material is heated and evaporated in a vacuum so as to be deposited on a non-magnetic support body; the ion plating method in which evaporated particles are ionized and accelerated by an electric field so as to adhere onto a non-magnetic support body; the sputtering method in which atoms are struck out of a target surface by argon ion generated by glow discharge in an atmosphere containing argon as a main content; and other PVD techniques.

It should be noted that when the magnetic layer is formed by way of the vacuum deposition method, in order to improve the characteristic in a high-density recording range, it is preferable to employ an oblique deposition method in which a magnetic metal material as a deposition source is used so that magnetic metal particles are deposited in an oblique direction onto a traveling non-magnetic support body.

Here, the magnetic layer preferably has a magnetization axis with an inclination of 20 to 90 degrees with respect to the surface of the non-magnetic support body. As this inclination angle of the magnetization axis increases, the characteristic in a high-density recording range is improved. It should be noted that the inclination of the magnetization axis of the magnetic layer can be controlled by changing the incoming angle of deposition particles with respect to the non-magnetic support body when depositing the particles.

It should be noted that in this deposition method, it is preferable to introduce an oxygen gas into the deposition atmosphere so as to obtain a film containing oxygen such as a Co-O thin film and a Co-Ni-O thin film. This enables to reduce the crystal particle size in the magnetic layer, reducing the medium noise. Moreover, when the crystal particle has a columnar configuration, it is possible to increase a configuration anisotropy in the oblique direction.

The aforementioned is the basic configuration of the magnetic recording medium according to the present invention. In this magnetic recording medium, it is possible to provide an additional configuration which is normally used in this type of magnetic recording medium, so as to further improve its characteristics.

For example, an under layer or an intermediate layer may be provided between the aforementioned non-magnetic support body and the magnetic layer or between multiple layers, so as to improve the adhesion between the layers and control the anti-magnetization force. Furthermore, it is possible to carry out a surface treatment on the non-magnetic support body so as to form fine convex and concave shapes so as to control the surface state.

Moreover, it is possible to provide a top coat layer made from a lubricant and anti-corrosive agent on the metal magnetic thin film serving as the magnetic layer. Moreover, on the opposite side of the non-magnetic support body not having the magnetic layer, it is possible to form a back coat layer from a non-magnetic pigment, binder, lubricant, and the like, in order to improve the magnetic recording medium running durability and to prevent charging and transfer. These materials may be those which are conventionally used.

EXAMPLES

Hereinafter, description will be directed to experiment results of the embodiment of the present invention.

EXAMPLE 1

Firstly, a vacuum deposition was carried out onto a polyethylene terephthalate (PET) film having a thickness of 6 $\mu$m by using Co as a deposition source while introducing an oxygen gas, so as to obtain a metal magnetic thin film (Co-O single-layered) having a film thickness of 200 nm. The metal magnetic thin film was formed under a condition as follows.

<Metal magnetic thin film formation condition>

Particle deposition angle: 45 to 90 degrees

Vacuum degree during deposition: $2 \times 10^{-2}$ Pa

Next, a protection film consisting of a DLC film was formed on the aforementioned metal magnetic thin film. Explanation will be given on a plasma CVD apparatus used for this film formation.

Figure 2:
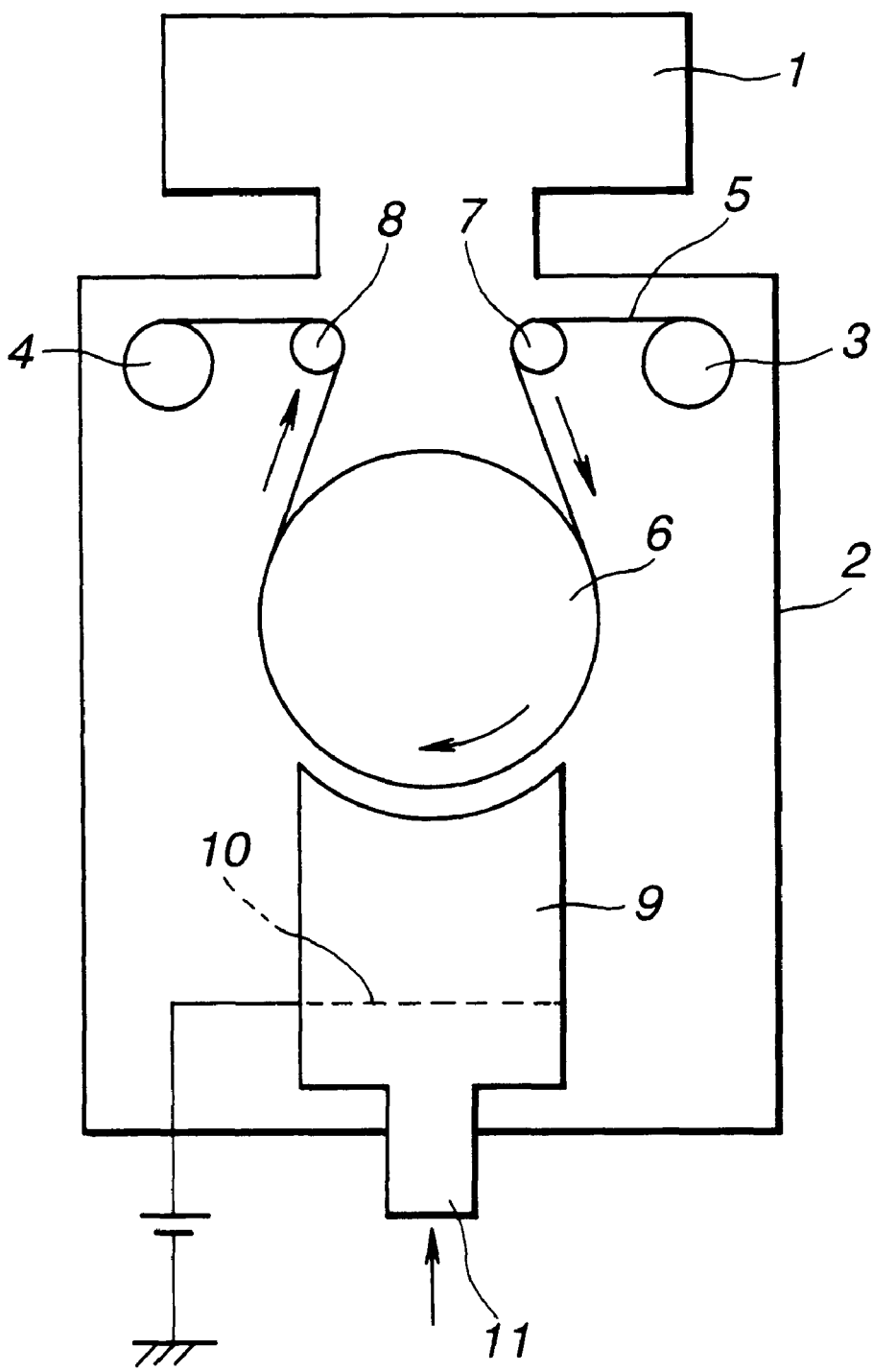
FIG. 2 shows a configuration of a plasma CVD apparatus used for forming the carbon protection film of the magnetic recording medium according to the present invention.

As shown in FIG. 2, this plasma CVD apparatus includes a vacuum chamber 2 from which air has been removed by a vacuum exhaust system 1. In this vacuum chamber, there are arranged a feed roll 3 and a winding-up roll 4 so that a tape 5 travels from this feed roll 3 toward the winding-up roll 4. During this travel, as has been described above, the metal magnetic thin film is formed on the film.

A cylindrical can 6 having a greater diameter than the rolls 3 and 4 is provided in the middle of the tape travel from the feed roll 3 to the winding-up roll 4.

This cylindrical can 6 is provided so that the tape 5 is pulled downward in the figure. This cylindrical can has a cooling apparatus (not depicted) inside so as to suppress deformation of the tape 5 due to temperature increase.

In the plasmas CVD apparatus having the aforementioned configuration, the tape 5 is successively fed from the feed roll 3 so as to travel along the circumference of the cylindrical can 6 and is wound up by the winding-up roll 4.

Moreover, guide rolls 7 and 8 each having a diameter smaller than the rolls 3 and 4 are provided between the feed roll 3 and the cylindrical can 6 and between the cylindrical can 6 and the winding-up roll, respectively. The guide rolls 7 and 8 serve to apply a predetermined tension to the tape so that tape can travel smoothly from the feed roll 3 to the cylindrical can 6 and from the cylindrical can 6 to the winding-up roll 4.

Moreover, below the cylindrical can 6, there is provided a gas reaction pipe 9 having a curved opening so as to be in parallel to the circumference of the cylindrical can 6. Inside the gas reaction pipe 9, there is provided a metal mesh-shaped electrode 10. This electrode 10 is supplied with current from a predetermined DC power source so that a predetermined DC voltage is applied between the electrode 10 and the cylindrical can 6. Moreover, the gas reaction pipe 9 has a gas supply port 11 for supplying a gas inside the gas reaction pipe 9. It should be noted that the gas reaction pipe 9 has a width almost identical to that of the cylindrical can 6 opposing to the gas reaction pipe 9.

In the plasma CVD apparatus having the aforementioned configuration, the pressure inside the vacuum chamber 2 was set to 30 Pa, and a voltage of 0.8 kV was applied between the electrode 10 and the cylindrical can 6 so as to cause discharge. In this state, a gas mixture containing ethylene and argon (ethylene: argon =85:15) was supplied as a raw material gas from the gas supply port 11. Thus, a carbon protection film having a thickness of 8 nm was formed on a metal magnetic thin film of a tape traveling around the circumeference of the cylindrical can 6.

After forming in this way a carbon protection film on the metal magnetic thin film, the tape was cut into a width of 6.35 mm, thus completing a magnetic tape. This is the sample of Example 1.

Examples 2 to 5 and Comparative Examples 1 and 2

Sample tapes were prepared by forming a carbon protection film in the same way as Example 1 except for the difference in the reaction gas composition and the voltage conditions shown in Table 1.

TABLE 1

|  | Reaction gas composition Ethylene:Argon | Voltage [kV] |
| --- | --- | --- |
| Example 1 | 85:15 | 0.8 |
| Example 2 | 80:20 | 1.0 |
| Example 3 | 80:20 | 1.2 |
| Example 4 | 70:30 | 1.5 |
| Example 5 | 70:30 | 2.0 |
| Comparative Ex. 1 | 80:20 | 0.6 |
| Comparative Ex. 2 | 80:20 | 0.7 |
| Comparative Ex. 3 | 70:30 | 2:5 |

Evaluation of Characteristics

The sample tapes of the Examples and the Comparative Examples were subjected to a Raman spectrum analysis, a shuttle travel test, still durability test, and friction test. The tests were carried out as follows.

Raman spectrum analysis: An argon ion laser having a wavelength of 514.5 nm was applied to a carbon film to excite a scattered light which was subjected to a spectrum measurement. A representative method for evaluation of the carbon protection film was employed to determine the intensity ratio A/B for the main peak intensity A appearing in the vicinity of 1550 $cm^{-1}$ with respect to the background intensity B.

Shuttle travel test: A digital video camera (trade name DVC-700 produced by Sony Co., Ltd.) was used to carry out one recording for 10 minutes in an environment of temperature 40° C. and relative humidity 30%. After this, reproduction was carried out 99 times to check a 100-th pass output with respect to an initial output. If this level down amount is within −3 dB, a signal amplifier circuit built in a digital video tape recorder will not affect the picture quality.

Still durability test: A digital video camera (trade name: DVC-700 produced by Sony Co., Ltd.) was used and a still state was maintained in an environment of temperature of −5 C, so as to check the time for becoming −3 dB with respect to an initial output.

Friction test: A sliding friction test was carried out in an environment of temperature 40° C. and relative humidity 80%. Results were expressed in friction coefficients.

Figure 3:
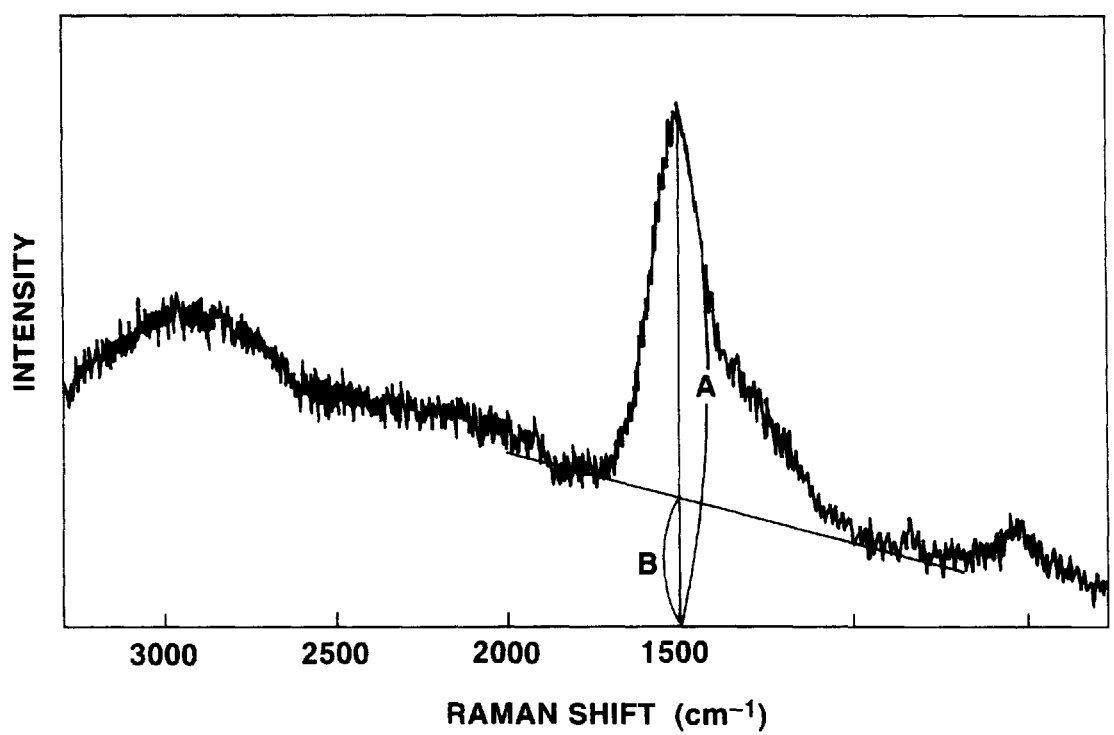
FIG. 3 shows a Raman spectrum of the carbon protection film of the magnetic recording medium according to the present invention.

Table 2 shows results of these tests. Moreover, FIG. 3 shows a Raman spectrum of the carbon protection film.

TABLE 2

|  | Raman intensity ratio A/B | Friction | Shuttle durability [dB] | Still durability |
|---|---|---|---|---|
| Example 1 | 2.1 | 0.29 | −2.8 | 100 min. |
| Example 2 | 2.5 | 0.26 | −2.7 | >120 min. |
| Example 3 | 2.7 | 0.26 | −2.0 | >120 min. |
| Example 4 | 3.1 | 0.26 | −2.0 | >120 min. |
| Example 5 | 4.2 | 0.25 | −1.8 | >120 min. |
| Comparative Ex. 1 | 1.5 | 0.48 | −4.2 | 10 min. |
| Comparative Ex. 2 | 2.0 | 0.42 | −3.5 | 30 min. |
| Comparative Ex. 3 | 4.5 | — | — | — |

As can be understood from the results of Table 2, the sample tapes having a carbon film whose Raman intensity ratio is equal to or above 2 exhibited a preferable shuttle characteristic, still characteristic, low friction, and excellent sliding durability.

On the contrary, the sample tapes of Comparative Examples 1 and 2 having a carbon protection film whose Raman intensity ratio is below 2 were not able to exhibit preferable characteristics. On the other hand, the sample tape of Comparative Example 3 having a carbon protection film whose Raman intensity ratio was 4.5 was damaged by heat during the film formation and could not be subjected to the tests.

As is clear from the aforementioned, according to the present invention, a carbon protection film has the intensity ratio of 2 or above for the main peak intensity appearing in the vicinity of wave number 1550 $cm^{-1}$ with respect to the background intensity, thus enabling to provide a magnetic recording medium having an excellent sliding durability and a high reliability.

What is claimed is:

1. A magnetic recording tape comprising:

a non-magnetic, tape-shaped support body;

a magnetic layer of a metal magnetic thin film formed on said non-magnetic, tape-shaped support body; and a carbon protection film formed on said magnetic layer, wherein said carbon protection film shows in a Raman spectrum obtained by Raman spectrum analysis using argon ion laser having a wavelength of 514.5 nm an intensity ratio from 2.5 to 4.2 for a main peak intensity appearing in a vicinity of a wave number 1550 $cm^{-1}$ with respect to a background intensity.

2. The magnetic recording tape as set forth in claim 1, wherein said carbon protection film is a diamond-like carbon formed by one of a chemical vapor deposition (CVD) method and by a sputtering method.

3. The magnetic recording tape as set forth in claim 1, wherein said carbon protection film has thickness in a range from 1 nm to 20 nm.

4. A magnetic recording tape comprising:

a magnetic layer of a metal magnetic thin film formed on a non-magnetic support body and a carbon protection film formed on said magnetic layer;

said carbon protection film showing in a Raman spectrum obtained by Raman spectrum analysis using an argon laser having a wavelength of 514.5 nm, an intensity ratio ranging from 2.5 to 4.2 for a main peak intensity appearing in the vicinity of wave number 1550 $cm^{-1}$ with respect to a background intensity;

said carbon protection film being a diamond-like carbon formed by chemical vapor deposition; and said carbon protection film having a thickness of 1 to 20 nm.

* * * * *